(12) United States Patent
Kogure et al.

(10) Patent No.: US 7,964,273 B2
(45) Date of Patent: *Jun. 21, 2011

(54) LIGHT REFLECTING SHEET AND MOLDED PRODUCT USING THE SAME

(75) Inventors: Masami Kogure, Chiba (JP); Hiroshi Kawato, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 446 days.

This patent is subject to a terminal disclaimer.

(21) Appl. No.: 11/572,877

(22) PCT Filed: Jul. 27, 2005

(86) PCT No.: PCT/JP2005/013768
§ 371 (c)(1),
(2), (4) Date: Jan. 29, 2007

(87) PCT Pub. No.: WO2006/011532
PCT Pub. Date: Feb. 2, 2006

(65) Prior Publication Data
US 2008/0062542 A1 Mar. 13, 2008

(30) Foreign Application Priority Data
Jul. 30, 2004 (JP) ................................. 2004-224016

(51) Int. Cl.
*B32B 27/08* (2006.01)
(52) U.S. Cl. ............... 428/319.3; 428/319.7; 428/317.9; 524/497
(58) Field of Classification Search ............... 428/319.3, 428/319.7, 319.9; 359/838; 524/497
See application file for complete search history.

(56) References Cited

U.S. PATENT DOCUMENTS

| 5,710,856 | A | * | 1/1998 | Ishii et al. ..................... 385/146 |
| 5,837,757 | A | * | 11/1998 | Nodera et al. ................. 524/87 |
| 6,001,929 | A | * | 12/1999 | Nodera et al. ............... 525/92 E |
| 6,630,525 | B2 | * | 10/2003 | Cella et al. ..................... 524/100 |
| 7,754,324 | B2 | * | 7/2010 | Watanabe et al. .......... 428/304.4 |
| 2002/0015299 | A1 | | 2/2002 | Koyama et al. |
| 2005/0191464 | A1 | * | 9/2005 | Takahashi et al. ............ 428/141 |
| 2007/0229995 | A1 | * | 10/2007 | Kawato et al. ................ 359/883 |
| 2008/0212213 | A1 | * | 9/2008 | Kogure et al. ................ 359/838 |

FOREIGN PATENT DOCUMENTS

| JP | 10 333133 | 12/1998 |
| JP | 11 174213 | 7/1999 |
| JP | 2001 235606 | 8/2001 |
| JP | 2002 333511 | 11/2002 |
| JP | 2004 070118 | 3/2004 |
| JP | 2004 101600 | 4/2004 |
| JP | 2004 149623 | 5/2004 |
| WO | WO 2004013664 A1 * | 2/2004 |
| WO | WO 2004104077 A1 * | 12/2004 |

* cited by examiner

*Primary Examiner* — Hai Vo
(74) *Attorney, Agent, or Firm* — Oblon, Spivak, McClelland, Maier & Neustadt, L.L.P.

(57) ABSTRACT

A light reflecting sheet having high light reflectance and an excellent light shielding property and a molded product using the same are provided. The light reflecting sheet has a light reflecting layer that has voids inside thereof and formed from a thermoplastic resin composition provided on at least one side of a base material sheet formed from a polycarbonate resin composition containing a combination of (A) 90 to 50% by mass of a polycarbonate-based polymer and (B) 10 to 50% by mass of titanium oxide. The molded product is formed from the light-reflecting sheet.

19 Claims, No Drawings

LIGHT REFLECTING SHEET AND MOLDED PRODUCT USING THE SAME

TECHNICAL FIELD

The present invention relates to a light reflecting sheet and a molded product using the same. More specifically, the present invention relates to a light reflecting sheet suitably used for light reflecting plates in backlights for liquid crystal displays, lighting fixtures, fluorescent lamps used in houses or various facilities, and light source parts such as LED (light-emitting diodes), EL (electroluminescence elements), plasma, laser, and the like; and a molded product using the same.

BACKGROUND ART

A light reflecting material is generally used for signboards, displays, backlights for liquid crystal displays, and the like. Conventionally used light reflecting sheet include a metal plate, a metal foil/plastic sheet, a metal-deposited plastic sheet, a foamed stretched PET (polyethylene terephthalate) film, and the like.

In recent years, applications of liquid crystal displays have been remarkably enlarged. Still larger growth is expected particularly in applications for liquid crystal TVs as well as in conventional use for displays in notebook personal computers. For monitors of 508 mm (20 inches) or less in size and notebook personal computers, a light guiding-type backlight is used as a light source. For liquid crystal TVs, a direct underlying-type backlight is used as a light source to attain high brightness and high resolution in medium-sized or wide screens measuring 508 mm (20 inches) or larger. In each backlight, a fluorescent lamp is used as a light source and a reflecting plate is used for efficiently guiding light from the fluorescent lamp to the liquid crystal unit. Various materials have been proposed for the reflecting plate.

In the light guiding-type backlight, a foamed PET film is placed under the light guiding plate to use as a reflecting plate. As the reflecting plate in the direct underlying-type backlight, a laminate of a foamed PET or foamed PP film and an aluminum plate, and a microcellular PET sheet are used. Among them a bent-up article of a laminate of a foamed PET film and an aluminum plate is used in many cases.

The present applicant has marketed a polycarbonate-based material for high reflecting plates developed by making use of his own technology of blending titanium oxide. The present applicant has also proposed a technology that an extruded sheet obtained from a polycarbonate resin (PC resin) composition with a high content of titanium oxide is heat-molded into a form of reflecting plate to use for the direct underlying-type backlight (for example, see Patent Document 1).

At present, a foamed reflecting film (for example, "Lumirror" ™, manufactured by Toray Industries, Inc.), which is used most frequently as a reflecting material for both direct underlying-type backlights and light-guiding type backlights, has a thickness as thin as 20 μm, so that the film exhibits no light shielding effect, and the light reflectance is also lower than that of a microcellular PET, which has begun being used as a new reflecting material. The polycarbonate-based high reflecting sheet proposed by the present applicant has higher light reflectance and light shielding effect as compared with the above-mentioned foamed reflecting film, but the light reflectance is lower that that of the microcellular PET.

Patent Document 1: Japanese Patent Application Laid-Open (JP-A) No. 2004-149623.

DISCLOSURE OF THE INVENTION

Problems to be Solved by the Invention

In view of the above circumstances, the present invention has an object to provide a light-reflecting sheet having a high light reflectance and an excellent light shielding property, and a molded product using the same.

Means for Solving the Problems

The present inventors have intensively investigated to solve the above problems and as a result, they have found that, when a light reflecting layer having voids inside thereof is provided on at least one surface of a base material sheet formed from a specific polycarbonate resin composition, there can be provided a light reflecting sheet that has a light reflectance higher than the case of individually using each of the base material sheet and the light reflecting layer, exhibits an excellent light shielding property, and can be heat-molded similarly to a single layer sheet formed from the polycarbonate resin composition. Based on this finding, the present invention has been accomplished.

Namely, the present invention provides a light reflecting sheet and a molded product using the same described below.

1. A light reflecting sheet wherein a light reflecting layer that is composed of a thermoplastic resin composition and has voids inside thereof is provided on at least one side of a base material sheet that is formed from a polycarbonate resin composition containing a combination of 90 to 50% by mass of polycarbonate-based polymer (A) and 10 to 50% by mass of titanium oxide (B).
2. The light reflecting sheet described in 1, wherein the average diameter of voids inside of the light-reflecting layer is 0.5 to 50 μm.
3. The light reflecting sheet described in 1 or 2, wherein the base material sheet is produced by heat-molding.
4. The light reflecting sheet described in any of 1 to 3, having an adhesive layer between the base material sheet and the light reflecting layer.
5. The light reflecting sheet described in any of 1 to 4, wherein the Y-value of light reflectance is at least 100.5% as measured by irradiating the surface of the light reflecting layer with light in visible region.
6. The light reflecting sheet described in any of 1 to 5, wherein the light transmittance is 0.4% or less as measured by irradiating the surface of the light-reflecting layer with light in visible region.
7. A molded product obtained by heat-molding the light reflecting sheet described in any of 1 to 6.

EFFECTS OF THE INVENTION

The present invention can provide a light reflecting sheet that has a higher light reflectance than the case of individually using each of a base material sheet and a light reflecting layer, exhibits an excellent light shielding property, and can be heat-molded similarly to a single layer sheet formed from a polycarbonate resin composition; and a molded product using the same.

BEST MODE FOR CARRYING OUT THE INVENTION

The base material sheet composing the light-reflecting sheet of the present invention is formed from a polycarbonate resin composition containing polycarbonate-based polymer (A) and titanium oxide powder (B).

Polycarbonate-based polymer (A) is either polycarbonate resin (A-0) or a mixture of polycarbonate-polyorganosiloxane copolymer (A-1) and polycarbonate resin (A-2). Polycarbonate resin (A-3 includes various kinds of polycarbonate resins but is preferably a polymer having the repeating unit whose structure is represented by general formula (1).

[Chemical formula 1]

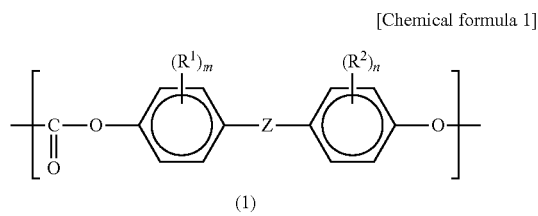

(1)

In general formula (1), $R^1$ and $R^2$ are each a halogen atom (for example, chlorine, fluorine, iodine) or an alkyl group having 1 to 8 carbon atoms (for example, methyl, ethyl, propyl, isopropyl, various butyl including n-butyl, isobutyl, sec-butyl and tert-butyl, various pentyl, various hexyl, various heptyl, and various octyl groups); m and n are each an integer of 0 to 4; when m is 2 to 4, $R^1$ may be the same or different from each other; when n is 2 to 4, $R^2$ may be the same or different from each other; and Z represents an alkylene group having 1 to 8 carbon atoms or an alkylidene group having 2 to 8 carbon atoms (for example, methylene, ethylene, propylene, butylene, pentylene, hexylene, ethylidene, isopropylidene, etc.), a cycloalkylene group having 5 to 15 carbon atoms or a cycloalkylidene group having 5 to 15 carbon atoms (for example, cyclopentylene, cyclohexylene, cyclopentylidene, cyclohexylidene, etc.), a single bond, a linkage represented by —$SO_2$—, —SO—, —S—, —O—, or —CO—, or a linkage represented by formula (2) or formula (2') below.

[Chemical formula 2]

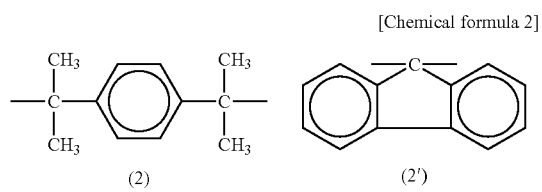

(2)                    (2')

Generally, the above polymer can be easily produced by reaction of a dihydric phenol represented by general formula (3):

[Chemical formula 3]

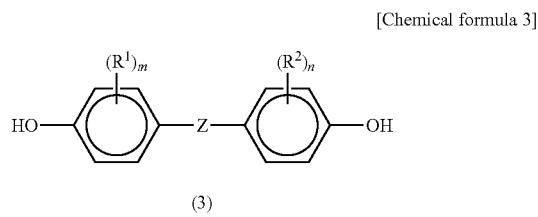

(3)

[wherein $R^1$, $R^2$, Z, m, and n are the same as described in general formula (1)]
with a carbonate precursor such as phosgene and the like. That is, the polymer can be produced by a reaction of a dihydric phenol and a polycarbonate precursor such as phosgene and the like in a solvent such as methylene chloride and the like in the presence of a publicly-known acid acceptor or a publicly-known molecular weight modifier. Alternatively, the polymer can be produced by an ester-exchange reaction between a dihydric phenol and a carbonate precursor like a carbonate ester compound or by other reactions.

The dihydric phenol represented by general formula (3) includes various kinds of dihydric phenols. In particular, 2,2-bis(4-hydroxyphenyl)propane (commonly known as bisphenol A) is preferred. As the dihydric phenol besides bisphenol A, there may be listed, for example, a bis(4-hydroxyphenyl) alkane such as bis(4-hydroxyphenyl)methane, 1,1-bis(4-hydroxyphenyl)ethane, 1,2-bis(4-hydroxyphenyl)ethane, and the like; a bis(4-hydroxyphenyl cycloalkane such as 1,1-bis(4-hydroxyphenyl)cyclohexane, 1,1-bis(4-hydroxyphenyl cyclodecane, and the like; 4,4'-dihydroxydiphenyl, bis(4-hydroxyphenyl) oxide, bis(4-hydroxyphenyl) sulfide, bis(4-hydroxyphenyl) sulfone, bis(4-hydroxyphenyl) sulfoxide, bis(4-hydroxyphenyl) ether, bis(4-hydroxyphenyl) ketone, and the like. Besides these, the dihydric phenol includes hydroquinone. These dihydric phenols may be used alone or as a mixture of two or more.

The carbonate ester compound includes, for example, a diaryl carbonate such as diphenyl carbonate and the like; a dialkyl carbonate such as dimethyl carbonate, diethyl carbonate, and the like; and others. When the polycarbonate is produced by the reaction of the above dihydric phenol and the carbonate precursor, a molecular weight modifier may be used as necessary. Any molecular weight modifier used conventionally for producing polycarbonate may be used without any particular limitations. The molecular weight modifier includes a monohydric phenol such as phenol, p-cresol, p-tert-butylphenol, p-tert-octylphenol, p-cumylphenol, p-nonylphenol, p-dodecylphenol, and the like.

Polycarbonate resin (A-0) may be a homopolymer prepared from one kind of the above dihydric phenol or a copolymer prepared from two or more kinds of the dihydric phenols. Polycarbonate resin (A-0 may be also a thermoplastic randomly branched polycarbonate resin prepared using a multifunctional aromatic compound together with the above dihydric phenol. The multifunctional aromatic compound, is generally called a branching agent and specifically includes 1,1,1-tris(4-hydroxyphenyl)ethane, α,α',α''-tris(4-hydroxyphenyl)-1,3,5-triisopropylbenzene, 1-[α-methyl-α-(4'-hydroxyphenyl)ethyl]-4-[α',α'-bis(4''-hydroxyphenyl)ethyl] benzene, phloroglucinol, trimellitic acid, isatin-bis(o-cresol), and the like.

The viscosity average molecular weight of polycarbonate resin (A-0) is preferably in the range of 13,000 to 30,000, and particularly preferably in the range of 15,000 to 25,000, in view of mechanical strength, particularly Izod impact strength, moldability, and the like. The viscosity average molecular weight (Mv) is calculated from the equation $[\eta]=1.23\times10^{-5} Mv^{0.83}$ using the intrinsic viscosity [η] obtained from viscosities of methylene chloride solutions of the polycarbonate resin measured at 20° C. with an Ubbelohde viscometer.

As polycarbonate resins having the above properties, there are commercially available aromatic polycarbonate resins such as "Tarflon FN3000A, FN2500A, FN2200A, FN1900A, FN1700A, and FN1500A" (™, manufactured by Idemitsu Petrochemical Co., Ltd.).

Polycarbonate-based polymer (A) is preferably a mixture of polycarbonate-polyorganosiloxane copolymer (A-1) and polycarbonate resin (A-2). As polycarbonate-polyorganosiloxane copolymer (A-1) (hereinafter, may be abbreviated as PC-POS copolymer), various kinds of copolymers may be used, but a preferred one is composed of a polycarbonate moiety having the repeating unit whose structure is represented by general formula (1) below

[Chemical formula 4]

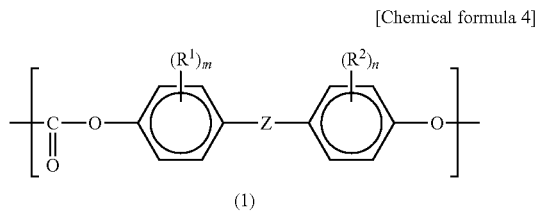

(1)

[In the formula, $R^1$, $R^2$, Z, m, and n are the same as described above.]
and a polyorganosiloxane moiety having the repeating unit whose structure is represented by general formula (4) below.

[Chemical formula 5]

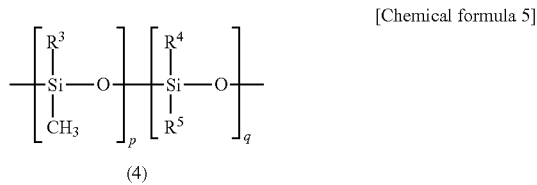

(4)

[In the formula, $R^3$, $R^4$, and $R^5$ are each a hydrogen atom, an alkyl group having 1 to 5 carbon atoms (for example, methyl, ethyl, propyl, n-butyl, isobutyl, etc.), or a phenyl group; p and q are each 0 or an integer of 1 or more; and the sum of p and q is an integer of 1 or more.] The polymerization degree of the polycarbonate moiety is preferably 3 to 100, and the polymerization degree of the polyorganosiloxane moiety is preferably 2 to 500.

The above PC-POS copolymer is a block copolymer composed of a polycarbonate moiety having the repeating unit represented by general formula (1) and a polyorganosiloxane moiety having the repeating unit represented by general formula (4), and the viscosity average molecular weight thereof is preferably 10,000 to 40,000, and more preferably 12,000 to 35,000. Such a PC-POS copolymer can be produced, for example, as follows: a pre-produced polycarbonate oligomer (hereinafter, abbreviated as PC oligomer), which will compose the polycarbonate moiety, and a polyorganosiloxane having reactive groups at the termini (for example, a polydialkylsiloxane such as polydimethylsiloxane (PDMS) and polydiethylsiloxane, polymethylphenylsiloxane, etc.), which will compose the polyorganosiloxane moiety are dissolved in a solvent such as methylene chloride chlorobenzene, chloroform, and the like; an aqueous sodium hydroxide solution of bisphenol is added to the resultant solution, and interfacial polycondensation is performed with a catalyst such as triethylamine, trimethylbenzylammonium chloride, and the like. The PC-POS copolymer produced by the method described in Japanese Patent Application Publication (JP-B) No. S44 (1969)-30105 or by the method described in Japanese Patent Application Publication No. S45 (1970)-20510 may be also used.

The PC oligomer having the repeating unit represented by general formula (1) can be easily produced by a solvent method, that is, by a reaction of the dihydric phenol represented by general formula (3) and a carbonate precursor such as phosgene, a carbonate ester compound, or the like in a solvent such as methylene chloride in the presence of a publicly-known acid acceptor or a publicly-known molecular weight modifier. Namely, for example, the PC oligomer can be produced, in the presence of a publicly-known acid acceptor or a publicly-known molecular weight modifier, by the reaction between the dihydric phenol and a carbonate precursor such as phosgene or an ester-exchange reaction between the dihydric phenol and a carbonate precursor such as a carbonate ester compound.

As the carbonate compound and the molecular weight modifier, those as described above may be used.

The PC oligomer used for producing the PC-POS copolymer in the present invention may be a homopolymer prepared using one kind of the above dihydric phenols or a copolymer prepared using two or more kinds of the dihydric phenols. Alternatively, the PC oligomer may be a thermoplastic randomly branched polycarbonate obtained using a multifunctional aromatic compound together with the above dihydric phenol.

In order to produce a PC-POS copolymer having an n-hexane soluble content of 1.00% by mass or less, for example, it is preferred that the content of polyorganosiloxane in the copolymer is 10% by mass or less, and that the copolymerization is preformed using a polyorganosiloxane having 100 or a larger number of the repeating unit represented by general formula (4) and using a catalyst such as a tertiary amine in an amount of $5.3 \times 10^{-3}$ mol/(kg-oligomer) or more.

As a polycarbonate resin serving as component (A-2) composing the polycarbonate resin composition relating to the present invention, a polymer having the repeating unit with the structure represented by the above mentioned general formula (1) is preferred. Specific explanation is as given for polycarbonate resin (A-0). Polycarbonate resin (A-2) may be a polycarbonate resin prepared by using a dihydric phenol different from the compound represented by general formula (3) in the reaction with a carbonate precursor such as phosgene, a carbonate ester compound, and the like.

With respect to 100 parts by mass of the total amount of component (A) and component (B) the ratio of component (A-1) to be blended in component (A) is 5 to 85 parts by mass and preferably 10 to 58 parts by mass, and the ratio of component (A-2) is 0 to 80 parts by mass and preferably 10 to 75 parts by mass. When the ratio of component (A-1) is 5 parts by mass or more, the polyorganosiloxane is dispersed well, providing sufficient flame retardancy to the resin composition. When the ratios of component (A-1) and component (A-2) are in the preferable ranges, good flame retardancy can be attained. The content of the polyorganosiloxane moiety in PC-POS may be selected as appropriate in accordance with the level of flame retardancy required for the resin composition finally obtained. The ratio of the polyorganosiloxane moiety in component (A-1) is preferably 0.3 to 10% by mass, and more preferably 0.5 to 5% by mass with respect to the total amount of component (A-1) and component (A-2). When the ratio is 0.3% by mass or more, the oxygen index is sufficient, and hence desired flame retardancy can be attained. When the ratio is 10% by mass or less, the heat resistance of the resin is not lowered, causing no cost-up of the resin. When the ratio is in the preferable range, a resin with a more suitable oxygen index and excellent flame retardancy can be obtained. Here, the "polyorganosiloxane" excludes any polyorganosiloxane component contained in the organosiloxane serving as component (D) described later.

Titanium oxide that is component (B) relating to the present invention is used in a form of fine powder in order to provide high reflectance and low transparency, that is, a high light shielding property, to the polycarbonate resin. Titanium oxide fine powder having various particle sizes can be produced by any of the chlorination method and the sulfuric acid method. The titanium oxide used in the present invention may be any of rutile form and anatase form, but rutile form is preferred in terms of thermal stability and weatherability. There is no particular limitation on the particle shape of the fine powder; any of scaly spherical, and irregular shapes may be used as appropriate.

Titanium oxide used as component (B) preferably has surfaces treated with a hydrated oxide of aluminum and/or silicon, an amine compound, a polyol compound, or the like. With this surface treatment, titanium oxide becomes more uniformly dispersed in the polycarbonate resin composition, the dispersion state becomes more stable, and compatibility of titanium oxide with an additional flame retardant is also increased. Thus, this surface treatment is preferred for producing a uniform composition. Examples of the hydrated oxides of aluminum or silicon, the amine compound, and the polyol compound used here include hydrated alumina, hydrated silica, triethanolamine, trimethylolethane, and the like, respectively. In the above surface treatment the treating method itself is not particularly limited and may be arbitrarily selected as appropriate. The amount of the surface-treating agent applied to the surface of titanium oxide particles is suitably but not limited to, 0.1 to 10.0% by mass with respect to titanium oxide in view of the light reflecting property of titanium oxide and the moldability of the polycarbonate resin composition.

In the polycarbonate resin composition relating to the present invention, the particle diameter of the titanium oxide powder used as component (B) is not particularly limited, but the average particle diameter is preferably 0.1 to 0.5 μm to exert the above-described effects efficiently. The amount of titanium oxide blended in the polycarbonate resin composition relating to the present invention is required to be 10 to 50 parts by weight, and preferably 20 to 50 parts by weight with respect to 100 parts by weight of the total amount of component (A) and component (B). When the amount is 10 parts by weight or more, a sufficient light shielding property can be obtained so that the light reflectance is not lowered. When the amount is 50 parts by weight or less, the composition can be easily pelletized by kneading extrusion the resin can be easily molded, and the molded products suffer from fewer silver streaks. In particular because a light shielding effect and high light reflectance are required for reflecting plates and reflecting frames in backlights for liquid crystal TVs, monitors, and the like, it is more preferred to blend component (B) in an amount of 20 to 35 parts by weight for such applications.

The content of surface acidic sites in titanium oxide used in the present invention is preferably 10 μmol/g or more. The content of surface basic sites is preferably 10 μmol/g or more. When the content of surface acidic sites is lower than 10 μmol/g or the content of surface basic sites is lower than 10 μmol/g, the titanium oxide is not sufficiently dispersed due to low reactivity to the organosiloxane compound working as a stabilizer, and the improvement of brightness in the molded product may be insufficient. The content of surface acidic sites is more preferably 15 μmol/g or more, and furthermore preferably 16 μmol/g or more, while the content of surface basic sites is more preferably 20 μmol/g or more, and furthermore preferably 25 μmol/g or more.

The contents of surface acidic sites and surface basic sites in titanium oxide are determined by potentiometric titration in a non-aqueous solution. Specifically, the content of surface acidic sites is determined by potentiometric titration of supernatant in a dispersion prepared by dispersing titanium oxide in an MIBK (methyl isobutyl ketone) solution containing 1/100 N of n-propylamine, using an MIBK solution containing 1/100 N of perchloric acid. The content of surface basic sites is determined by potentiometric titration of supernatant in a dispersion prepared by dispersing titanium oxide in an MIBK (methyl isobutyl ketone) solution containing 1/100 N of acetic acid, using an MIBK solution containing 1/100 N of potassium methoxide.

When polytetrafluoroethylene (hereinafter, also called as "PTFE" in some cases) with fibril-forming ability is blended as component (C) in the polycarbonate resin composition relating to the present invention, the resin composition can be provided with a preventive effect against dripping of melt as necessary and can obtain high flame retardancy. The average molecular weight of PTFE is preferably 500,000 or more, more preferably 500,000 to 10,000,000, and still more preferably 1,000,000 to 10,000,000. The amount of component (C) is preferably 0 to 1.0 part by mass, and more preferably 0.1 to 0.5 part by mass with respect to 100 parts by mass of the total amount of component (A) and component (B). When the amount is 1.0 part by mass or less, no adverse effect is caused on the impact strength or the appearance of molded products, and extrusion of a strand is hardly pulsated on kneading extrusion, so that pellets can be stably produced. When the amount of PTFE is within the above-described range, a suitable preventive effect against dripping of melt is imparted and excellent flame retardancy is attained.

As the polytetrafluoroethylene (PTFE) having fibril-forming ability, there may be used, but not limited to, for example, PTFE classified into Type 3 in accordance with the ASTM standard. This type of PTFE includes, specifically, "Teflon 6-J" (™, manufactured by DuPont-Mitsui Fluorochemicals Co., Ltd.), "Polyflon D-1" and "Polyflon F1-3" (™, manufactured by Daikin Industries, Ltd.), and the like. Examples other than Type 3 include "Algoflon F5" (™, manufactured by Montefluos SPA), "Polyflon MPAFA-100" (™, manufactured by Daikin Industries, Ltd.), and the like. Two or more kinds of these PTFEs may be used in combination.

Such PTFE having fibril-forming ability can be obtained, for example, by polymerizing tetrafluoroethylene in an aqueous solvent in the presence of sodium peroxydisulfide, potassium peroxydisulfide, or ammonium peroxydisulfide under a pressure of 0.007 to 0.7 MPa at 0 to 200° C., preferably 20 to 100° C.

The polycarbonate resin composition relating to the present invention preferably contain an organosiloxane as component (D) to prevent degradation of the resin and to maintain mechanical strength, stability, heat resistance, and other properties of the resin. Specifically, the organosiloxane includes an alkylhydrogensilicone and an alkoxysilicone.

The alkylhydrogensilicone includes, for example, methylhydrogensilicone, ethylhydrogensilicone, and the like. The alkoxysilicone includes, for example, methoxysilicone, ethoxysilicone, and the like. Specifically, a particularly preferred alkoxysilicone is a silicone compound having an alkoxy group bonded to a silicon atom directly or through a divalent hydrocarbon group, which is exemplified by an organopolysiloxane having a straight-chain, cyclic, networked, or partly branched straight-chain structure, and a straight-chain organopolysiloxane is particularly preferred. Further specifically, an organopolysiloxane having a molecular structure in which an alkoxy group is bonded to the silicone main chain through a methylene group is preferred.

As the organosiloxane that is component (D), for example, commercially available organosiloxanes such as "SH1107, SR2402, BY16-160, BY16-161, BY16-160E, and BY16-161E" (manufactured by Dow Corning Toray Co., Ltd.), and the like may be suitably used.

The amount of the organosiloxane to be added, although depends on the amount of titanium oxide blended, is preferably 0.05 to 2.0 parts by mass with respect to 100 parts by mass of the total amount of component (A) and component (B). When the amount is 0.05 part by mass or more, the polycarbonate resin is hard to degrade, so that the molecular weight of the resin is not lowered. When the amount is 2.0 parts by mass or less, the cost and effects are well balanced, and no silver streaks appear on the surface of a molded product, so that the molded product attains good appearance.

In the polycarbonate resin composition relating to the present invention, besides components (A), (B), (C), and (D), various kinds of inorganic fillers, additives, other synthetic resins, elastomers and the like may be blended as necessary. As the inorganic fillers blended for improving the mechanical strength and durability of the polycarbonate resin composition or as an extender there may be mentioned, for example, glass fibers (GF), carbon fibers, glass beads, glass flakes, carbon black, calcium sulfate, calcium carbonate, calcium silicate, alumina, silica, asbestos, talc, clay, mica, quartz powder and the like. The additives include, for example, an oxidant such as hindered phenols amines, and the like; an ultraviolet (UV) absorber such as benzotriazoles and benzophenones; an external lubricant such as aliphatic carboxylate esters, paraffin, silicone oil, polyethylene wax, and the like; a release agent; an antistatic agent; a colorant; and the like. The other synthetic resins include various kinds of resins such as polyethylene, polypropylene, polystyrene, AS resin (acrylonitrile-styrene copolymer), ABS resin (acrylonitrile-butadiene-styrene copolymer), polymethylmethacrylate, and the like. The elastomers include isobutylene-isoprene rubber, styrene-butadiene rubber, ethylene-propylene rubber, an acrylic elastomer, and the like.

The light-reflecting layer composing the light reflecting sheet of the present invention is formed from a thermoplastic resin composition and has voids inside thereof. The thermoplastic resin includes polyolefin resin such as polypropylene, polyethylene and the like, polystyrene resin polycarbonate resin, polyacetal resin polyester resin polyamide resin, and the like. The voids inside of the light reflecting layer can be formed by stretching a sheet or film formed from a resin composition containing the thermoplastic resin and inorganic particles and/or organic particles incompatible with the thermoplastic resin. Namely, by stretching such sheet or film, air bubbles can be involved in the stretched film, and these air bubbles serve as the voids inside of the light-reflecting layer (stretched film) In this case, polyolefin resin and polyester resin are preferred as the thermoplastic resin. Alternatively, the voids inside of the light reflecting layer can be formed by foaming a sheet or film formed from a polyester resin composition using supercritical fluid, whereby a light reflecting layer (film or sheet) containing air bubbles can be formed.

The average diameter of voids inside of the light reflecting layer is preferably 0.3 to 50 μm more preferably 0.5 to 40 μm, and still more preferably 1 to 30 μm in view of light reflecting effect. When the average diameter is 0.3 μm or more, sufficient light reflecting effect can be obtained. When the average diameter is 50 μm or less, the voids hardly protrude from the surface of the light-reflecting layer, so that the surface is not roughened. The percentage of the voids in the light-reflecting layer is generally 10 to 80% by volume, preferably 11 to 70% by volume, and more preferably 15 to 65% by volume. When the percentage of the voids is 10% by volume or more, sufficient light reflecting effect can be obtained. When the percentage of the voids is 80% by volume or less, the voids hardly protrude from the surface of the light-reflecting layer, so that the surface is not roughened.

The organic particles include acrylic cross-linked particles, styrene-based cross-linked particles, and the like. Acrylic cross-linked particles and styrene-based cross-linked particles are preferred. The commercially available acrylic cross-linked particles include "MBX" (™, manufactured by Sekisui Plastics Co., Ltd.). The inorganic particles include silica, titanium oxide, alumina, zinc oxide, barium sulfate, calcium carbonate, zeolite, kaoline, talc, and the like. Silica and titanium oxide are preferred. The commercially available silica includes "Mizukasil" (™, manufactured by Mizusawa Industrial Chemicals, Ltd.). These particles may be used alone or in combination of two or more.

The amount of these particles used upon stretching may be selected in such a range that the percentage of the voids inside of the light reflecting layer becomes 10 to 80% by volume, which is usually 3 to 35% by mass, preferably 5 to 25% by mass, and more preferably 6 to 20% by mass in the thermoplastic resin composition forming the light reflecting layer. The average diameter of these particles may be selected in such a range that the average diameter of the voids becomes 0.5 to 50 μm which is usually 0.05 to 15 μm, preferably 0.1 to 10 μm and more preferably 0.3 to 3 μm.

A commercially available film or sheet may be used as the light reflecting layer, and examples are "Lumirror" (™, manufactured by Toray Industries, Inc.), "White Refstar" (™, manufactured by Mitsui Chemicals, Inc.), "MCPET" (™, manufactured by Furukawa Electric Co. Ltd.), and the like.

The base material sheet composing the light reflecting sheet of the present invention is molded as follows: the above-described PC resin composition is dried at usually 120 to 140° C. for 2 to 10 hr extruded with an extruder equipped with an evacuation apparatus and molded into a sheet at a die temperature of 200 to 260° C. and a roll temperature of 120 to 180° C. Here, the conditions for drying the PC resin composition is preferably at 130 to 140° C. for 2 to 10 hr. and more preferably at 130 to 140° C. for 4 to 10 hr.

The PC resin composition may be dried in usual heated air in dried air, under vacuum, or the like. This drying process can remove most of water originated from the raw materials and volatile byproducts generated in blending.

The extruder used for forming the sheet is required to be equipped with an evacuation apparatus. This apparatus functions for processing the PC resin composition in molten state under a subatmospheric pressure and reduces the pressure down to 2.6 kPa (60 mmHg) or less, and preferably to 3.9 kPa (30 mmHg) or less on extrusion. This vapor evacuation can remove water remained in the PC resin composition, volatile byproducts generated in blending and also secondary volatile byproducts generated during the extrusion molding.

If the PC resin composition is not fully dried or the volatile matters are not fully removed on extrusion molding, the base material sheet may be foamed or get a rough surface, possibly causing lowered reflectance or nonuniformity in reflection.

In forming the sheet the die temperature is usually 200 to 260° C. preferably 200 to 250° C., and more preferably 200 to 240° C. If the die temperature exceeds 260° C. draw resonance phenomenon is likely to occur, causing unevenness in thickness of the sheet in the width (especially at the edges) and longitudinal directions, and hence the sheet in itself or the surface of a heat-molded product thereof tends to exhibit nonuniformity in reflection. This phenomenon is more likely to occur on forming a sheet using the PC resin composition relating to the present invention containing a large amount of titanium oxide powder.

On forming the sheet, the temperature of the cooling roll is usually 120 to 180° C. and preferably 120 to 170° C. If the temperatures of all the rolls are lower than 120° C. sizing among the nip rolls become difficult due to high stiffness of a melt of the present, PC resin composition, causing inhomogeneity of the surface state in the width and longitudinal directions, and therefore the sheet in itself or the surface of a heat-molded product thereof tends to exhibit nonuniformity in reflection.

If the temperatures of all the rolls exceed 170° C., due to cohesion or adhesion to the rolls, the surfaces may be adhered together, the composition may be partially remained on the rolls in peeling off, or the sheet may become warped. Thus a base material sheet having uniform reflecting property is difficult to obtain.

The light-reflecting layer may be directly formed on the base material sheet. However, if adhesion is not sufficient, it is preferred to form the light reflecting layer after the surface of the base material sheet is treated with corona-discharging or underlying coating. The underlying coating may be applied in the course of the sheet production process (in-line coating) or in another coating process (off-line coating) after the base material sheet is produced. The material used for the underlying coating may be selected as appropriate without any particular limitation. Suitable materials include copolymerized polyester resin, polyurethane resin, acrylic resin, methacrylic resin, various kinds of coupling agents, and the like.

The light reflecting layer can be formed on the base material sheet by simply laminating the film or sheet serving as the light reflecting layer on the base material sheet, or by bonding them using an adhesive such as a polyurethane-based anchor coat and the like.

In the light-reflecting sheet of the present invention obtained as described above, the light reflecting layer involved in diffuse reflection of light is provided on at least one surface of the base material sheet. The thickness of the base material sheet is usually 0.4 to 2 mm, preferably 0.5 to 2 mm, and more preferably 0.6 to 1.5 mm. When the thickness of the base material sheet is 0.4 mm or more, on heat-molding a base material sheet having a large area, unevenness in thickness can be easily prevented due to the absence of draw-down, and in-plane nonuniformity in light reflection is less likely to cause. When the thickness of the base material sheet is 2 mm or less, on heating for heat-molding, the temperature differences are small among one surface of the base material sheet, the inside of the base material sheet, and the other surface of the base material sheet, so that a heat-molded product having a uniform light reflecting property can be obtained.

The thickness of the light-reflecting layer is usually 0.05 to 1.5 mm preferably 0.08 to 0.3 mm, and more preferably 0.1 to 0.2 mm. When the thickness of the light-reflecting layer is 0.05 mm or more, the light reflecting layer exhibits sufficient light reflecting property. When the thickness of the light-reflecting layer is 1.5 mm or less, the light-reflecting sheet is excellent in high reflecting property.

In order to lower the light transmittance, in the light reflecting sheet of the present invention, a light shielding layer may be provided to the base material sheet on the surface opposite to the surface on which the light reflecting layer is formed. The light shielding layer can be formed by laminating on the base material sheet, a light shielding solution in which a black pigment is dispersed in a base substance (binder) such as an acrylurethane-based resin and the like. To form the light shielding layer, a coating having a dry thickness of 1 to 30 μm is formed by applying the light shielding solution by direct coating with a gravure roll, by atomizing the solution in a mist, by spraying the solution, or by other methods, followed by drying the coating at a temperature approximately ranging from 80 to 120° C. in a hot-air oven. Co-extrusion of the PC resin composition with a light shielding resin may be also used.

The thickness of the light-shielding layer is usually 1 to 30 μm, preferably 1 to 20 μm, and more preferably 2 to 20 μm. When the thickness of the light-shielding layer is 1 μm or more, transmission of visible light is sufficiently blocked. When the thickness of the light-shielding layer is 30 μm or less, the coating can be dried in a short time because the efficiency of drying is not lowered on forming the light-shielding layer by a coating process.

For the light-reflecting sheet of the present invention, the Y-value of light reflectance is preferably at least 100.5% as measured by irradiating the surface of the light reflecting layer with light in visible region, and the light transmittance is 0.4% or less as measured by irradiating the surface of the light-reflecting layer with light in visible region. The above Y-value is determined by measuring the reflectance relative to a white plate (ceramic tile) in visible light region (400 to 700 nm) at a viewing angle of 10 degree using a D65 light source.

It is advantageous for the base material sheet that the light reflectance is preferably 96% or more, more preferably 97% or more, and still more preferably 98% or more, and that the light transmittance is preferably 1% or less, more preferably 0.9% or less, and still more preferably 0.8% or less. Such high light reflectance of the base material sheet can be attained by adjusting the amount of titanium oxide in the PC resin composition forming the base material sheet.

On the other hand, the base material sheet having such an excellent light shielding property as described above can be attained by adjusting the light shielding layer provided thereto.

When the Y-value and the light transmittance satisfy the above conditions, brightness sufficient for a given purpose of use in reflection can be attained. In addition, when the base material sheet has heat-moldability, the shape can be easily designed in accordance with the types and the numbers of light sources, thereby providing a light box having high and uniform brightness.

Since the light reflecting sheet of the present invention has heat-moldability, a light reflecting plate having a light reflecting surface shaped in accordance with the shapes and the numbers of light sources can be produced using this light reflecting sheet under specific heat-molding conditions. On heat-molding, the sheet heating temperature (the surface temperature of the sheet) is usually 160 to 200° C. and preferably 170 to 200° C. The average extension ratio is usually 1.1 to 2 times, and preferably 1.2 to 1.8 times.

In the present invention, the method for heat-molding is not particularly limited, and there may be used press molding, vacuum molding, vacuum compressed air molding, hot-plate molding, corrugated-plate molding and the like. The molding method generically called vacuum molding includes drape forming, matched mold forming, pressure bubble plug-assisted vacuum forming, plug-assisted molding, vacuum snap-back molding air-slip forming, trapped sheet-contact heat-pressure forming, straight vacuum molding, and the like. Vacuum molding is carried out at a pressure of 1 MPa or less as appropriate.

At a sheet heating temperature of 160° C. or higher, heat-molding can be carried out easily, and at 200° C. or lower, chalk mark is not likely to develop on the surface of the sheet. Further when the extension ratio is 1.2 times or less, it is easy to design a light reflecting plate shaped in accordance with the shapes of light sources. When the extension ratio is 2 times or less, the heat-molded product has no unevenness in thickness thereby nonuniformity in reflectance is not likely to occur.

Upon the heat-molding, it is preferred that the light reflecting sheet is preliminarily dried. The preliminary drying can prevent foaming caused by moisture absorption. Suitable condition for drying is usually at 100 to 120° C. for 5 to 12 hr.

By adjusting the conditions for sheet production and heat-molding as appropriate, there can be provided a molded product in which the thickness of the light reflecting surface varies by 0.2 mm or less. When the unevenness in thickness is 0.2 mm or less, uniform surface reflection property can be attained. The shape of the molded product may be selected as appropriate in accordance with the shape, number, and characteristics of light sources. For example, in the case of a light reflecting plate in direct underlying-type backlights for liquid crystal displays, the molded product may have shape disclosed in Japanese Patent Application Laid-Open (JP-A) No. 2000-260213, Japanese Patent Application Laid-Open (JP-A) No. 2000-356959, Japanese Patent Application Laid-Open (JP-A) No. 2001-297613, and Japanese Patent Application Laid-Open (JP-A) No. 2002-32029.

EXAMPLES

The present invention will be described in further detail with reference to Examples below, but it should be construed that the present invention is in no way limited to these examples.

Production Example 1

Production of PC-PDMS Copolymer (1) Production of PC Oligomer

In 400 L of an aqueous solution containing 5% by mass of sodium hydroxide, 60 kg of bisphenol A was dissolved to prepare an aqueous sodium hydroxide solution of bisphenol A. This solution, while kept at room temperature was introduced at a flow rate of 138 L/hr together with methylene chloride at a flow rate of 69 L/hr through an orifice plate into a tube reactor having a tube length of 10 m. In parallel to these flows, phosgene was blown into the tube reactor at a flow rate of 10.7 kg/hr for 3 hr to perform the reaction continuously. The tube reactor used here had a tube-in-jacket structure. Cooling water was passed through the jacket so as to keep the temperature of the effluent reaction solution at 25° C. The pH value of the effluent reaction solution was adjusted at 10 to 11.

The reaction solution thus obtained was left to stand, and separated aqueous phase was removed to obtain methylene chloride phase (220 liters) containing a PC oligomer in a concentration of 317 g/L. The PC oligomer obtained here had a polymerization degree of 2 to 4 and a chloroformate group concentration of 0.7 N.

(2) Production of Reactive PDMS

A mixture of 1,483 g of octamethylcyclotetrasiloxane, 96 g of 1,1,3,3-tetramethyldisiloxane, and 35 g of 86% sulfuric acid was stirred at room temperature for 17 hr. Then, the oil phase was collected, here was added 25 g of sodium hydrogen carbonate, and the mixture was stirred for 1 hr. After filtration, low-boiling substances were removed by vacuum-distillation at 150° C. under 3 Torr (400 Pa) to obtain an oil.

To a mixture of 60 g of 2-allylphenol and 0.0014 g of platinum as platinum chloride-alcoholate complex, 294 g of the oil obtained above was added at 90° C. The mixture was stirred for 3 hr while keeping the temperature at 90 to 115° C. The product was extracted with methylene chloride, the extract was washed with 80% aqueous methanol three times to remove excess 2-allylphenol and dried over anhydrous sodium sulfate. The solvent was distilled off under a reduced pressure while the temperature increased up to 115° C. In the phenol-capped reactive PDMS (polydimethylsiloxane) thus obtained, the number of repeating dimethylsilanoxy units was 30, which was determined by NMR measurement.

(3) Production of PC-PDMS Copolymer

In 2 L of methylene chloride, 138 g of the reactive PDMS obtained in (2) was dissolved, and the resultant solution was mixed with 10 L of the PC oligomer obtained in (1). Here were added a solution prepared by dissolving 26 g of sodium hydroxide in 1 L of water and 5.7 mL of triethylamine, and the mixture was stirred and performed the reaction at 500 rpm at room temperature for 1 hr.

After the reaction, a solution prepared by dissolving 600 g of bisphenol A in 5 L of a 5.2-mass % aqueous sodium hydroxide solution, 8 L of methylene chloride, and 96 g of p-tert-butylphenol were added to this reaction system, and the mixture was stirred and performed the reaction at 500 rpm at room temperature for 2 hr.

After the reaction, 5 L of methylene chloride was added to the reaction mixture, the organic phase was successively subjected to water-washing with 5 L of water, alkali-washing with 5 L of 0.03 N aqueous sodium hydroxide solution acid-washing with 5 L of 0.2 N hydrochloric acid, and water-washing with 5 L of water (twice). Finally, methylene chloride was removed to obtain a flaky PC-PDMS copolymer. The obtained PC-PDMS copolymer was dried under vacuum at 120° C. for 24 hr. The viscosity average molecular weight was 17,000 and the PDMS content was 3.0% by mass. The viscosity average molecular weight (Mv) and the PDPS content were determined by the following methods.

(1) Viscosity Average Molecular Weight (Mv)

The viscosities of methylene chloride solutions was measured at 20° C. with an Ubbelohde viscometer to obtain the intrinsic viscosity of [η], from which the Mv value was calculated using the equation of $[\eta] = 1.23 \times 10^{-5} Mv^{0.83}$.

(2) PDMS Content

The PDMS content was obtained from $^1$H-NMR measurement based on the intensity ratio of the peak at 1.7 ppm assigned to the methyl groups in the isopropyl moiety derived from bisphenol A to the peak at 0.2 ppm assigned to the methyl groups in the dimethylsiloxane unit.

Production Example 2

Production of Polycarbonate Resin Composition-1

With respect to 100 parts by mass of a mixture consisting of 46 parts by mass of polycarbonate-polydimethylsiloxane copolymer (PC-PDMS, Mv=17,000, PDMS content=3.0% by mass) obtained in Production Example 1, 24 parts by mass of bisphenol A-type straight-chain polycarbonate ("Tarflon FN1500"™, manufactured by Idemitsu Petrochemical Co, Ltd., Mv=14,500), and 30 parts by mass of titanium oxide powder ("PF726"™, manufactured by Ishihara Sangyo Kaisha, Ltd.) were blended 1.2 parts by mass of organosiloxane ("BY16-161"™, manufactured by Dow Corning Toray Co., Ltd.), 0.3 part by mass of polytetrafluoroethylene (PTFE, "CD076"™, manufactured by Asahi Glass Co., Ltd.), and 0.1 part by mass of triphenylphosphine ("JC263"™, manufactured by Johoku Chemical Co., Ltd.). The resultant mixture was melted and kneaded using a biaxial extruder to obtain a polycarbonate resin composition.

Production Example 3

Production of polycarbonate resin composition-2

With respect to 120 parts by mass of a mixture consisting of 46 parts by mass of polycarbonate-polydimethylsiloxane copolymer (PC-PDMS, Mv=17,000, PDMS content=3.0% by mass) obtained in Production Example 1, 24 parts by mass of bisphenol A-type straight-chain polycarbonate ("Tarflon FN1500"(™), manufactured by Idemitsu Petrochemical Co., Ltd., Mv=14,500), and 50 parts by mass of titanium oxide powder ("PF726"(™), manufactured by Ishihara Sangyo Kaisha, Ltd.) were blended 1.8 parts by mass of organosiloxane ("BY16-161"(™), manufactured by Dow Corning Toray Co., Ltd.), 0.3 part by mass of polytetrafluoroethylene (PTFE, "CD076"(™), manufactured by Asahi Glass Co., Ltd.), and 0.1 part by mass of triphenylphosphine ("JC263"(™), manufactured by Johoku Chemical Co., Ltd.). The resultant mixture was melted and kneaded using a biaxial extruder to obtain a polycarbonate resin composition.

Production Example 4

Production of polycarbonate resin composition-3

With respect to 110 parts by mass of a mixture consisting of 59 parts by mass of polycarbonate-polydimethylsiloxane copolymer (PC-PDMS, Mv=17,000, PDMS content=3.0% by mass) obtained in Production Example 1, 31 parts by mass of bisphenol A-type straight-chain polycarbonate ("Tarflon FN1500"(™), manufactured by Idemitsu Petrochemical Co., Ltd., Mv=14,500), and 20 parts by mass of titanium oxide powder ("PF726"(™), manufactured by Ishihara Sangyo Kaisha, Ltd.) were blended 0.8 part by mass of organosiloxane ("BY16-161"(™), manufactured by Dow Corning Toray Co., Ltd.), 0.3 part by mass of polytetrafluoroethylene (PTFE, "CD076"(™), manufactured by Asahi Glass Co., Ltd.), and 0.1 part by mass of triphenylphosphine ("JC263"(™), manufactured by Johoku Chemical Co., Ltd.). The resultant mixture was melted and kneaded using a biaxial extruder to obtain a polycarbonate resin composition.

Production Example 5

Production of polycarbonate resin composition-4

With respect to 75 parts by mass of a mixture consisting of 46 parts by mass of polycarbonate-polydimethylsiloxane copolymer (PC-PDMS, Mv=17,000, PDMS content=3.0% by mass) obtained in Production Example 1, 24 parts by mass of bisphenol A-type straight-chain polycarbonate ("Tarflon FN1500"(™), manufactured by Idemitsu Petrochemical Co., Ltd., Mv=14,500), and 5 parts by mass of titanium oxide powder ("PF726"(™), manufactured by Ishihara Sangyo Kaisha, Ltd.) were blended 0.5 part by mass of organosiloxane ("BY16-161"(™), manufactured by Dow Corning Toray Co., Ltd.), 0.3 part by mass of polytetrafluoroethylene (PTFE, "CD076"(™), manufactured by Asahi Glass Co., Ltd.), and 0.1 part by mass of triphenylphosphine ("JC263"(™), manufactured by Johoku Chemical Co., Ltd.). The resultant mixture was melted and kneaded using a biaxial extruder to obtain a polycarbonate resin composition.

Example 1

Polycarbonate resin composition-1 (PC-1, pellet) was dried at 140° C. in a hot-air oven for 4 hr. Using an extruding machine equipped with a uniaxial extruder 65 mm in diameter having an evacuation apparatus, a gear pump, and a coat hanger die 60 cm in width, the dried composition was extruded in a horizontal direction and molded into a sheet using vertical triple cooling rolls to obtain a sheet 0.8 mm in thick. Here, the cylinder temperature was 250 to 260° C. the pressure for evacuation was 1.3 kPa (10 mmHg), the die temperature was 210° C., the temperatures of the first, second, and third rolls were 120° C., 150° C., and 170° C., respectively, and the extrusion rate was 30 kg/hr.

A light reflecting polyester film ("Lumirror E60L"™, manufactured by Toray Industries, Inc.) was laminated on one side of this sheet to prepare a light reflecting sheet. The light reflectance (Y-value) and the total light transmittance were measured by the following methods. The results are shown in Table 1.

(1) Light Reflectance (Y-Value)

The Y-value was evaluated by measuring the reflectance relative to a white plate (ceramic tile) in, visible light region (400 to 700 mm) at a viewing angle of 10 degree using a D65 light source with a spectrophotometer "LCM2020+" manufactured by Macbeth Corporation.

(2) Total Light Transmittance

The total light transmittance was measured in accordance with JIS K7105.

Example 2

A base material sheet having a thickness of 0.6 mm was prepared using polycarbonate resin composition-1 (PC-1, pellet) in a similar manner to Example 1. A light reflecting polyester film ("Lumirror E60L"™, Toray Industries, Ltd.) was laminated on one side of this sheet to prepare a light-reflecting sheet. The light reflectance (Y-value) and the total light transmittance were measured by the above method. The results are shown in Table 1.

Example 3

A base material sheet having a thickness of 0.6 mm was prepared using polycarbonate resin composition-1 (PC-1, pellet) in a similar manner to Example 1. One surface of this sheet was coated with a polyesterpolyurethane-based two component-curing anchor coat ("Dicdry LX901/KW75"™, manufactured by Dainippon Ink and Chemicals, Inc.), which was prepared by mixing LX901 and KW75 in a mass ratio of 9:1, in 10 μm thick to form an adhesive layer. On the adhesive layer, a light reflecting polyester film ("Lumirror E60L"™, manufactured by Toray Industries, Ltd.) was laminated and bonded to prepare a light-reflecting sheet. The light reflectance (Y-value) and the total light transmittance were measured by the above method. The results are shown in Table 1.

Example 4

A base material sheet having a thickness of 0.6 mm was prepared using polycarbonate resin composition-1 (PC-1, pellet) in a similar manner to Example 1. One surface of this sheet was coated with a paint ("SY915 SUMI JK"™manufactured by Tokyo Printing Ink Mfg. Co., Ltd.), in which a black pigment was dispersed in a base resin, so that the dry thickness became 10 μm. The coating was dried at 100° C. in a hot-air oven for 30 mm to form a light-shielding layer.

On the surface opposite to the surface on which the light-shielding layer was formed, a light reflecting polyester film ("Lumirror E60L"™, manufactured by Toray Industries, Ltd.) was laminated to prepare a light-reflecting sheet. The light reflectance (Y-value) and the total light transmittance were measured by the above method. The results are shown in Table 1.

Example 5

A light-reflecting sheet was prepared in a similar manner to Example 2 except that polycarbonate resin composition-2

(PC-25 pellet) was used in place of polycarbonate resin composition-1. The measurements were performed in a similar manner. The results are shown in Table 1.

Example 6

A light-reflecting sheet was prepared in a similar manner to Example 2 except that polycarbonate resin composition-2 PC-3, pellet) was used in place of polycarbonate resin composition-1. The measurements were performed in a similar manner. The results are shovel in Table 1.

Example 7

A light-reflecting sheet was prepared in a similar manner to Example 2 except that polycarbonate resin composition-2 (PC-2 pellet) was used in place of polycarbonate resin composition-1. The measurements were performed in a similar manner. The results are shown in Table 1.

Example 8

A light-reflecting sheet was prepared in a similar manner to Example 2 except that a polypropylene-based reflecting film ("White Refstar"™, manufactured by Mitsui Chemicals, Inc.) was used in place of the light reflecting polyester film. The measurements were performed in a similar manner. The results are show in Table 1.

Example 9

A light-reflecting sheet was prepared in a similar manner to Example 2 except that a microcellular PET sheet ("MCRET"™, manufactured by Furukawa Electric Co., Ltd.) was used in place of the light reflecting polyester film. The measurements were performed in a similar manner. The results are shown in Table 1.

Comparative Example 1

The light reflectance (Y-value) and the total light transmittance of the light reflecting polyester film ("Lumirror E60L"™, manufactured by Toray Industries, Ltd.) were measured by the above method. The results are shown in Table 1.

Comparative Example 2

The light reflectance (Y-value) and the total light transmittance of the microcellular PET sheet ("MCRET"™, manufactured by Furukawa Electric Co., Ltd.) were measured by the above method. The results are shown in Table 1.

Comparative Example 3

A base material sheet having a thickness of 0.6 mm was prepared using polycarbonate resin composition-1 (PC-1, pellet) in a similar manner to Example 1. The light reflectance (Y-value) and the total light transmittance of this sheet were measured by the above method. The results are show in Table 1.

Comparative Example 4

A base material sheet having a thickness of 0.8 in was prepared using polycarbonate resin composition-1 (PC-1, pellet) in a similar manner to Example 1. The light reflectance (Y-value) and the total light transmittance of this sheet were measured by the above method. The results are shown in Table 1.

Comparative Example 5

A base material sheet having a thickness of 0.8 mm was prepared in a similar manner to Example 1 except that polycarbonate resin composition-3 (PC-3, pellet) was used in place of polycarbonate resin composition-1. The light reflectance (Y-value) and the total light transmittance of this sheet were measured by the above method. The results are shown in Table 1.

Comparative Example 6

A base material sheet having a thickness of 0.6 mm was prepared in a similar manner to Example 1, except that polycarbonate resin composition-4 (PC-4, pellet) was used in place of polycarbonate resin composition-1. A light reflecting polyester film ("Lumirror E60L"™, manufactured by Toray Industries, Ltd.) was laminated on one side of this sheet to prepare a light-reflecting sheet. The light reflectance Y-value) and the total light transmittance were measured by the above method. The results are shown in Table 1.

TABLE 1

| | Light reflecting layer | | | | Base material sheet | | | |
|---|---|---|---|---|---|---|---|---|
| | Type | Thickness (mm) | Average void diameter (μm) | Void (bubble) content (% by volume) | Material | Thickness (mm) | Y-value (%) | Transmittance (%) |
| Example 1 | E60L | 0.19 | 28 | 60 | PC-1 | 0.8 | 101.5 | 0.1 |
| Example 2 | E60L | 0.19 | 28 | 60 | PC-1 | 0.6 | 101.0 | 0.3 |
| Example 3 | E60L | 0.19 | 28 | 60 | PC-1 | 0.6 | 101.0 | 0.3 |
| Example 4 | E60L | 0.19 | 28 | 60 | PC-1 | 0.6 | 101.0 | <0.1 |
| Example 5 | E60L | 0.19 | 28 | 60 | PC-2 | 0.6 | 101.6 | <0.1 |
| Example 6 | E60L | 0.19 | 28 | 60 | PC-3 | 0.6 | 100.9 | 0.4 |
| Example 7 | E60V | 0.19 | 28 | 60 | PC-1 | 0.6 | 100.9 | 0.3 |
| Example 8 | White Refstar | 0.18 | 10 | 20 | PC-1 | 0.6 | 101.8 | <0.1 |
| Example 9 | MCPET | 1 | 10 | 20 | PC-1 | 0.6 | 101.9 | <0.1 |
| Comparative Example 1 | E60L | 0.19 | 28 | 60 | — | — | 99.5 | 3.8 |
| Comparative Example 2 | MCPET | 1 | 10 | 20 | — | — | 100.4 | 2.2 |

TABLE 1-continued

| | Light reflecting layer | | | | Base material sheet | | | |
|---|---|---|---|---|---|---|---|---|
| | Type | Thickness (mm) | Average void diameter (μm) | Void (bubble) content (% by volume) | Material | Thickness (mm) | Y-value (%) | Transmittance (%) |
| Comparative Example 3 | — | — | — | — | PC-1 | 0.6 | 99.0 | 0.3 |
| Comparative Example 4 | — | — | — | — | PC-1 | 0.8 | 99.0 | 0.2 |
| Comparative Example 5 | — | — | — | — | PC-3 | 0.8 | 98.5 | 0.5 |
| Comparative Example 6 | E60L | 0.19 | 28 | 60 | PC-4 | 0.6 | 100.1 | 1.2 |

INDUSTRIAL APPLICABILITY

The light reflecting sheet of the present invention and the molded product using the same are suitably used for light reflecting plates in backlights for liquid crystal displays, lighting fixtures, fluorescent lamps for houses or various facilities, and light source parts such as LED (light-emitting diodes), EL (electroluminescence elements), plasma, laser and the like.

The invention claimed is:

1. A light reflecting sheet comprising:
a light reflecting layer; and
a base material sheet attached to the light reflecting layer; wherein
the light reflecting layer comprises a polyester resin and 3 to 35 wt % of fillers dispersed within the polyester resin, the fillers including both inorganic and organic particles, the light reflecting layer having voids inside thereof with a void content in the range from 60 to 80% by volume,
the base sheet consists of a single layer comprising:
(A) a polycarbonate-based polymer; and
(B) titanium oxide;
wherein an amount of the titanium oxide (B) is from 10 to 50 parts by mass with respect to 100 parts by mass of a total amount of the polycarbonate-based polymer (A) and the titanium oxide (B);
a Y-value of light reflectance of the light reflecting sheet is greater than a Y-value of the light reflecting layer,
the Y-value of the light reflecting sheet is greater than a Y-value of the base material sheet,
The Y-value of the light reflecting sheet is at least 100.5% and
A light transmittance of the reflecting sheet is 0.4% or less as measured by irradiating the surface of the light-reflecting layer with light invisible region.

2. The light reflecting sheet according to claim 1, wherein the average diameter of the voids inside of the light reflecting layer is 0.5 to 50 μm.

3. The light reflecting sheet according to claim 1, wherein the base material sheet is produced by heat-molding.

4. The light reflecting sheet according to claim 1, further comprising an adhesive layer between the base material sheet and the light reflecting layer.

5. A molded product obtained by heat-molding the light reflecting sheet according to claim 1.

6. The light reflecting sheet according to claim 1, wherein the polycarbonate-based polymer of the base material sheet is a polycarbonate resin or a mixture of a polycarbonate-polyorganosiloxane copolymer and a polycarbonate resin.

7. The light reflecting sheet according to claim 6, wherein the polycarbonate-based polymer of the base material sheet is a polycarbonate resin of a polymer represented by formula (1)

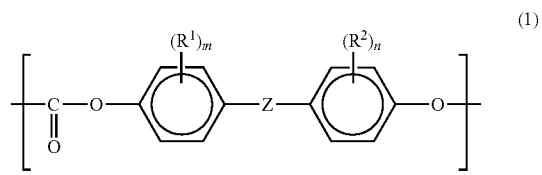

wherein
$R^1$ and $R^2$ are each a halogen atom or an alkyl group having 1 to 8 carbon atoms, m and n are each an integer of 0 to 4,
with the proviso that when m is 2 to 4, $R^1$ may be the same or different from each other, and
when n is 2 to 4, $R^2$ may be the same or different from each other, and Z represents an alkylene group having 1 to 8 carbon atoms or an alkylidene group having 2 to 8 carbon atoms, a cycloalkylene group having 5 to 15 carbon atoms or a cycloalkylidene group having 5 to 15 carbon atoms, a single bond, a linkage represented by —$SO_2$—, —SO—, —S—, —O—, or —CO—, or a linkage represented by formula (2) or formula (2')

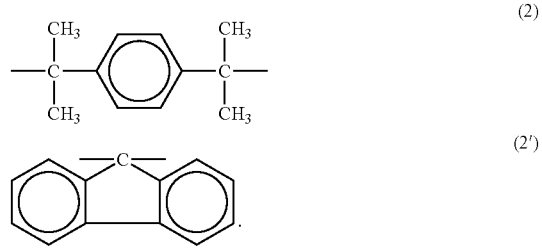

8. The light reflecting sheet according to claim 7, wherein the polymer represented by formula (1) further comprises a branching agent selected from the group consisting of 1,1,1-tris(4-hydroxyphenyl)ethane, α,α',α"-tris(4-hydroxyphenyl)-1,3,5-triisopropylbenzene, 1-[α-methyl-α-(4'-hydroxyphenyl)ethyl]-4-[α',α'-bis(4"-hydroxyphenyl)ethyl]benzene, phloroglucinol, trimellitic acid, and isatin-bis(o-cresol).

9. The light reflecting sheet according to claim 7, wherein a viscosity average molecular weight of the polycarbonate resin is from 13,000 to 30,000.

10. The light reflecting sheet according to claim 6, wherein the polycarbonate-based polymer of the base material sheet is a mixture of a polycarbonate-polyorganosiloxane copolymer and a polycarbonate resin, wherein the polyorganosiloxane has a structure represented by formula (4)

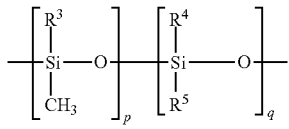

(4)

wherein $R^3$, $R^4$, and $R^5$ are each a hydrogen atom, an alkyl group having 1 to 5 carbon atoms or a phenyl group, p and q are each 0 or an integer of 1 or more, and the sum of p and q is an integer of 1 or more; and the polycarbonate resin has a structure represented by formula (1)

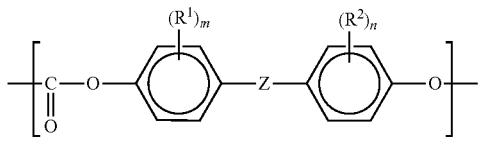

(1)

wherein $R^1$ and $R^2$ are each a halogen atom or an alkyl group having 1 to 8 carbon atoms, m and n are each an integer of 0 to 4, with the proviso that when m is 2 to 4, $R^1$ may be the same or different from each other, and when n is 2 to 4, $R^2$ may be the same or different from each other, and Z represents an alkylene group having 1 to 8 carbon atoms or an alkylidene group having 2 to 8 carbon atoms, a cycloalkylene group having 5 to 15 carbon atoms or a cycloalkylidene group having 5 to 15 carbon atoms, a single bond, a linkage represented by —$SO_2$—, —SO—, —S—, —O—, or —CO—, or a linkage represented by formula (2) or formula (2')

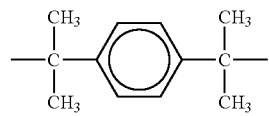

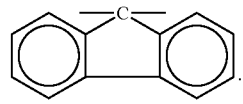

11. The light reflecting sheet according to claim 10, wherein a viscosity average molecular weight of the polycarbonate resin is from 10,000 to 40,000.

12. The light reflecting sheet according to claim 10, wherein a content of the polycarbonate-polyorganosiloxane copolymer is 5 to 85 parts by mass and a content of polycarbonate resin is 0 to 80 parts by mass, both with respect to 100 parts by mass of the polycarbonate-based polymer and titanium oxide.

13. The light reflecting sheet according to claim 12, wherein a content of the polyorganosiloxane in the polycarbonate-polyorganosiloxane copolymer is 0.3 to 10% by mass of the total mass of the polycarbonate-polyorganosiloxane copolymer and polycarbonate resin.

14. The light reflecting sheet according to claim 1, wherein the titanium oxide is in a rutile form.

15. The light reflecting sheet according to claim 1, wherein the titanium oxide has surfaces treated with at least one material selected from the group consisting of a hydrated oxide of aluminum, a hydrated oxide of silicon, an amine compound and a polyol compound.

16. The light reflecting sheet according to claim 1, wherein an average particle size of the titanium oxide is from 0.1 to 0.5 μm.

17. The light reflecting sheet according to claim 1, wherein the base material sheet consisting of a single layer further comprises a polytetrafluoroethylene able to form fibrils.

18. The light reflecting sheet according to claim 1, wherein the base material sheet consisting of a single layer further comprises an organosiloxane comprising an alkylhydrogensilicone and an alkoxysilicone.

19. The light reflecting sheet according to claim 18, wherein a content of the organosiloxane is 0.05 to 2.0 parts by mass with respect to 100 parts by mass of the polycarbonate-based polymer and titanium oxide.

* * * * *